Jan. 1, 1946. S. C. FISHER 2,392,086
MOTOR VEHICLE CONTROL
Filed Aug. 17, 1943
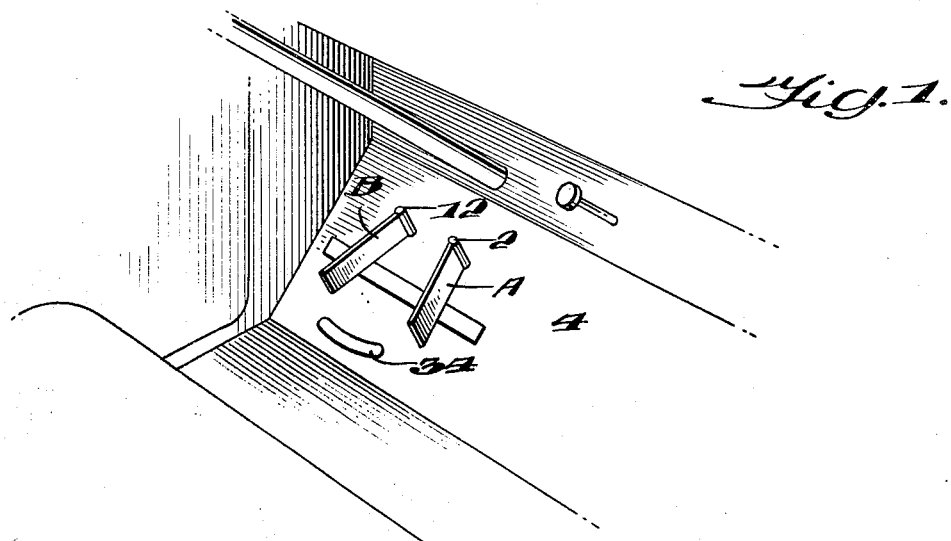
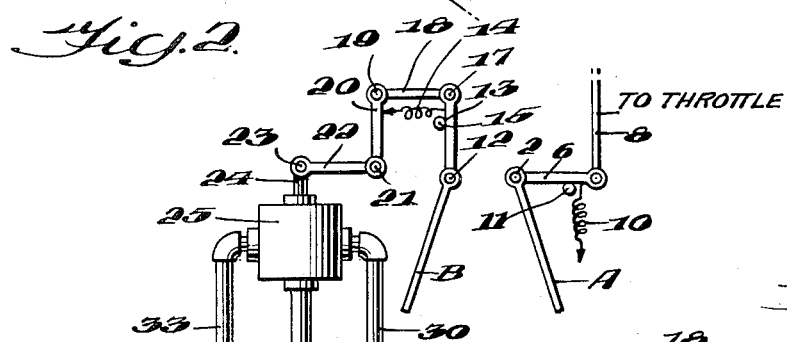
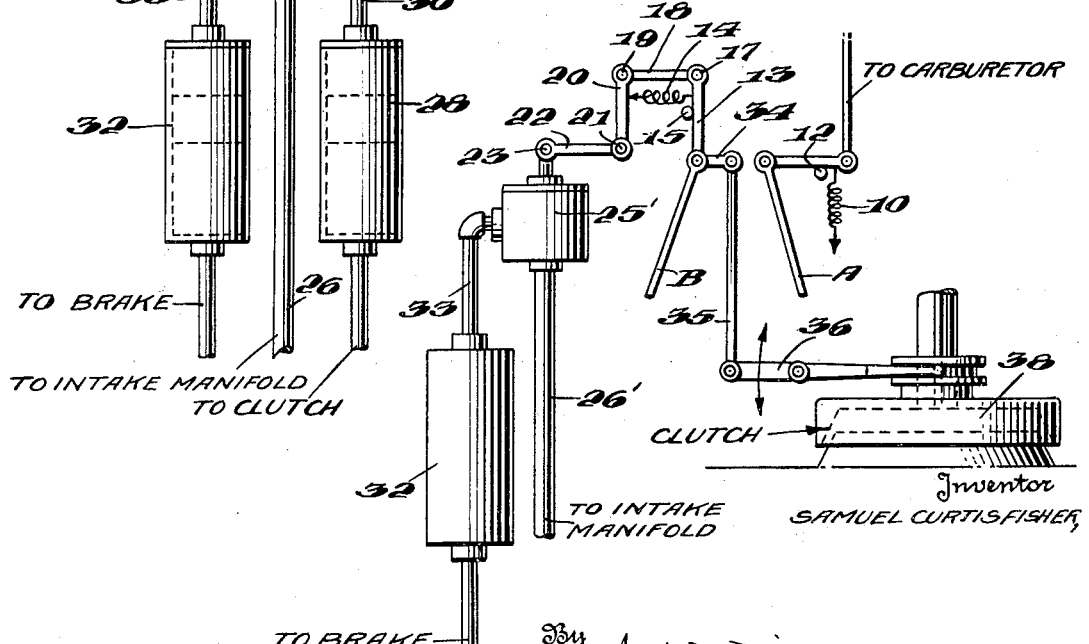
Inventor
SAMUEL CURTIS FISHER,
By Martin T. Fisher,
Attorney.

Patented Jan. 1, 1946

2,392,086

UNITED STATES PATENT OFFICE 2,392,086

MOTOR VEHICLE CONTROL

Samuel Curtis Fisher, New York, N. Y.

Application August 17, 1943, Serial No. 498,961

3 Claims. (Cl. 192—3)

This invention is a control mechanism for a motor vehicle, having to do with the foot operated control for the accelerator and brake, or accelerator, brake and clutch.

The prior art recognizes that since a car going 30 miles an hour travels at the rate of 44 feet a second, even a fraction of a second gained in releasing the accelerator and applying the brake, or releasing the accelerator and applying the brake and releasing the clutch, is very important.

However, insofar as I am aware, the devices of the prior art require the foot to make at least two movements in different directions to slow down or stop the car, one movement in one direction to release the accelerator, and another movement in another direction to apply the brake. According to this invention, the accelerator and brake controls are so arranged that a single, lateral movement of the foot in one direction releases the accelerator and applies the brake. This single, unidirectional movement is simply a quick flip of the right foot from right to left, such a single, quick, lateral movement in one direction, without the necessity of changing the direction of travel of the operator's foot, serving to release the accelerator and apply the brake, or release the accelerator, apply the brake and throw out the clutch. The fact that only one movement of the foot is involved, and not two movements, means that the brake is applied more quickly than heretofore.

More specifically, the control for the accelerator comprises a pedal which is positioned in a substantially vertical plane, and pivoted on an axis approximately perpendicular to the floor board where the foot pedals are usually mounted. The brake pedal is also positioned in a substantially vertical plane on an axis which is preferably substantially perpendicular to such floor boards. These pedals are spaced apart, say about twice the width of the operator's foot, and the operator's foot is between them. When the operator swings his foot to the right, it engages the accelerator pedal and acts to speed up the motor in the usual way. When it is desired to stop or slow down the car, the foot is given a strong, quick, lateral, unidirectional movement to the left, which single movement releases the accelerator pedal and applies the brake pedal in a very small fraction of a second. If a car is going 30 miles per hour and ½ second is saved in applying the brake, the car stops within a distance 22 feet less than if another ½ second were used in applying the brake, and this 22 feet thereby saved would avoid many collisions, both with other vehicles and with pedestrians.

The invention will be further described in connection with the accompanying drawing, in which:

Fig. 1 is a perspective view showing the pedal controls as they would appear on the floor board of a car.

Fig. 2 is a diagrammatic view showing the control of this invention where vacuum operated cylinders release the clutch and apply the brake.

Fig. 3 is a diagrammatic view of a modification, where a vacuum operated cylinder applies the brake, while the clutch is released by the movement of the foot.

Referring now to the drawing, the accelerator pedal A is pivoted to move on the axis 2 which is approximately perpendicular to the inclined floor board 4 of the car. The accelerator pedal is rigidly connected with an arm 6 which in turn is connected to a rod 8 controlling the throttle valve in the usual way, the usual tension spring 10 pulling the control back to idling position against the stop 11.

The brake control pedal B is pivoted on an axis 12, which is approximately perpendicular to the floor boards and is rigidly connected to an operating arm 13 and is pulled by the usual spring 14 toward a stop 15. Arm 13 is pivoted at 17 to link 18 pivoted at 19 to one arm 20 of a bell crank lever pivoted at 21, the other end 22 of the bell crank being pivoted at 23 with a lost motion connection to the control stem 24 of a valve illustrated generally at 25, which is connected to the pipe 26 leading to the intake manifold for supplying suction. A clutch operating cylinder 28 is connected by pipe 30 to valve 25, and a brake operating cylinder 32 is connected by pipe 33 to the valve 25.

The two pedals are spaced apart to accommodate the operator's foot, with some leeway, as shown in Fig. 1, and a curved plate 34 may be positioned as shown, on which the driver rests his heel. The driver's right foot is between the two pedals A and B, and it is evident that a quick, lateral, unidirectional movement from right to left will release the accelerator pedal A and instantly engage the pedal B, which operates valve 25, to operate the pistons in the cylinders to apply the brake and release the clutch and quickly stop the car.

The clutch operating cylinder 28 in the above description can be omitted and the left foot of the driver can be used to throw out the clutch in the usual way.

In the construction shown in Fig. 3, the pedals are arranged substantially as described in connection with Figs. 1 and 2, pedal B being rigidly connected to a lever 34 in turn connected to a link 35 for operating the arm 36 connected to throw the clutch 38 in and out of operation. Pedal B is also connected through links and levers as in Fig. 2, to simultaneously operate a valve 25' connected by pipe 26' to the intake manifold and by pipe 33 to a brake operating cylinder 32.

With the described arrangement, it will again be evident that a single, quick, lateral, unidirectional movement of the foot from right to left releases the accelerator pedal A and operates pedal B to operate the pistons in the cylinders to apply the brake and release the clutch. In this arrangement also the clutch operating mechanism can be omitted and the clutch thrown out by operating the usual clutch pedal with the left foot, as is customary.

Instead of using vacuum cylinders as a source of power, other power supplying means may be used, such as compressed air, for example.

While the preferred embodiment of the invention has been illustrated in some detail, it should be understood that the invention is not limited to the precise details illustrated, but may be carried out in other ways.

I claim as my invention:

1. Control mechanism for a motor vehicle comprising an accelerator pedal lever provided with means for mounting the lever for movement in a horizontal plane, and adapted to be actuated by a lateral movement of the driver's foot in a horizontal plane, a brake-control pedal lever provided with means, laterally spaced from said accelerator pedal lever mounting means, for mounting the brake-control lever for movement in a horizontal plane, and adapted to be actuated by a lateral movement of the driver's foot in a horizontal plane, said pedals being mounted separately on the floor board of the vehicle with a space between them for the driver's foot, whereby a single lateral unidirectional movement of the driver's foot in a horizontal plane to right or left releases one pedal and instantly engages the other pedal.

2. Control mechanism for a motor vehicle comprising an accelerator pedal lever provided with means for mounting the lever for movement in a horizontal plane and adapted to be actuated by a lateral movement of the driver's foot in a horizontal plane, a brake and clutch-control pedal lever provided with means, laterally spaced from said accelerator pedal lever and its mounting, for mounting the brake and clutch control lever for movement in a horizontal plane and adapted to be actuated by a lateral movement of the driver's foot in a horizontal plane, whereby the brake is applied and the clutch thrown out simultaneously, said pedals being mounted separately on the floor board of the vehicle with a space between them for the driver's foot, whereby a single lateral unidirectional movement of the driver's foot in a horizontal plane to right or left releases one pedal and instantly engages the other pedal.

3. Control mechanism for a motor vehicle comprising an accelerator pedal lever, a brake and clutch-control pedal lever provided with means, laterally spaced from said accelerator lever pedal mounting means, for mounting the brake and clutch-control lever for movement in a horizontal plane and adapted to be actuated by a lateral movement of the driver's foot in a horizontal plane, whereby the brake is applied and the clutch thrown out simultaneously, said pedals being mounted separately on the floor board of the vehicle with a space between them for the driver's foot whereby a single lateral movement of the driver's foot to the right or left in a horizontal plane releases one pedal and engages the other.

SAMUEL CURTIS FISHER.